(No Model.) 2 Sheets—Sheet 1.

H. L. ROOSEVELT, Dec'd.
A. ROOSEVELT, Executor.
ELECTRO PNEUMATIC MECHANICAL MOVEMENT.

No. 375,001. Patented Dec. 20, 1887.

(No Model.) 2 Sheets—Sheet 2.

H. L. ROOSEVELT, Dec'd.
A. ROOSEVELT, Executor.
ELECTRO PNEUMATIC MECHANICAL MOVEMENT.

No. 375,001. Patented Dec. 20, 1887.

UNITED STATES PATENT OFFICE.

ALFRED ROOSEVELT, OF NEW YORK, N. Y., EXECUTOR OF HILBORNE L. ROOSEVELT, DECEASED.

ELECTRO-PNEUMATIC MECHANICAL MOVEMENT.

SPECIFICATION forming part of Letters Patent No. 375,001, dated December 20, 1887.

Original application filed April 25, 1881, Serial No. 31,716. Divided and this application filed May 20, 1887. Serial No. 238,903. (No model.)

*To all whom it may concern:*

Be it known that HILBORNE L. ROOSEVELT, late of the city, county, and State of New York, has invented a new and useful Electro-Pneumatic Mechanical Movement, for the ringing of bells or the doing of other mechanical work at a distance by a controlling operator, of which the following is a full, true, and exact description, reference being had to the accompanying drawings.

His invention consists in an electro-pneumatic contrivance by which work may be done at a distance by a controlling operator by the use of a battery, which is automatically cut out as soon as its work is done.

Similar letters refer to similar parts in the two figures.

Figure 1:
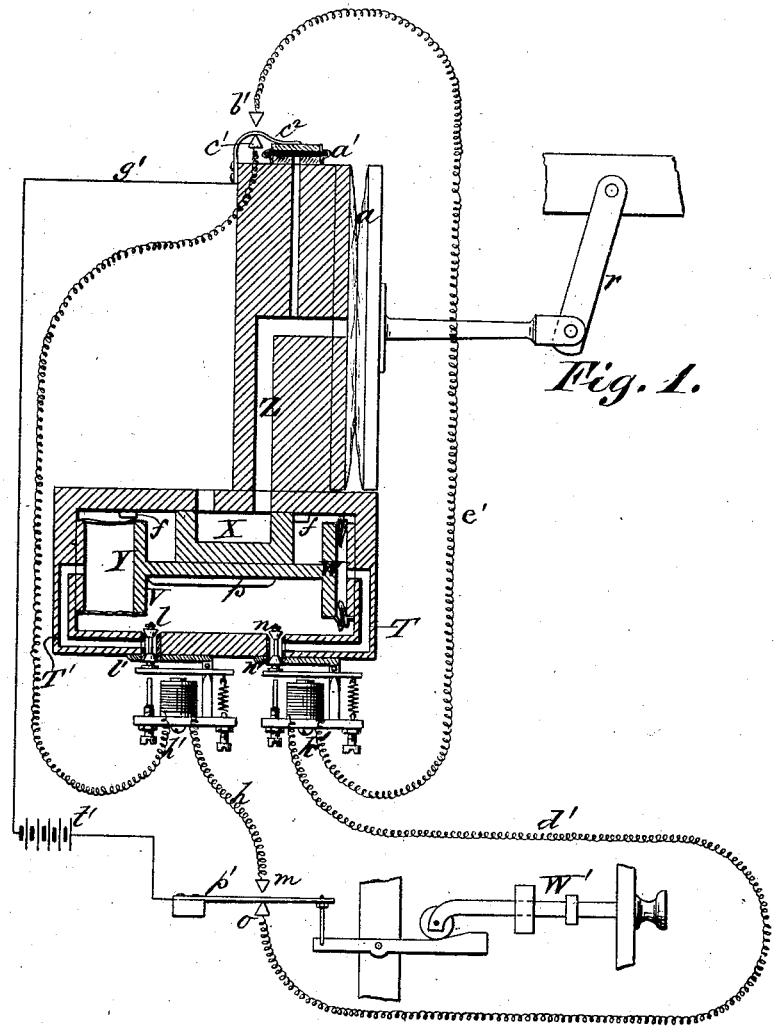
Figure 2:
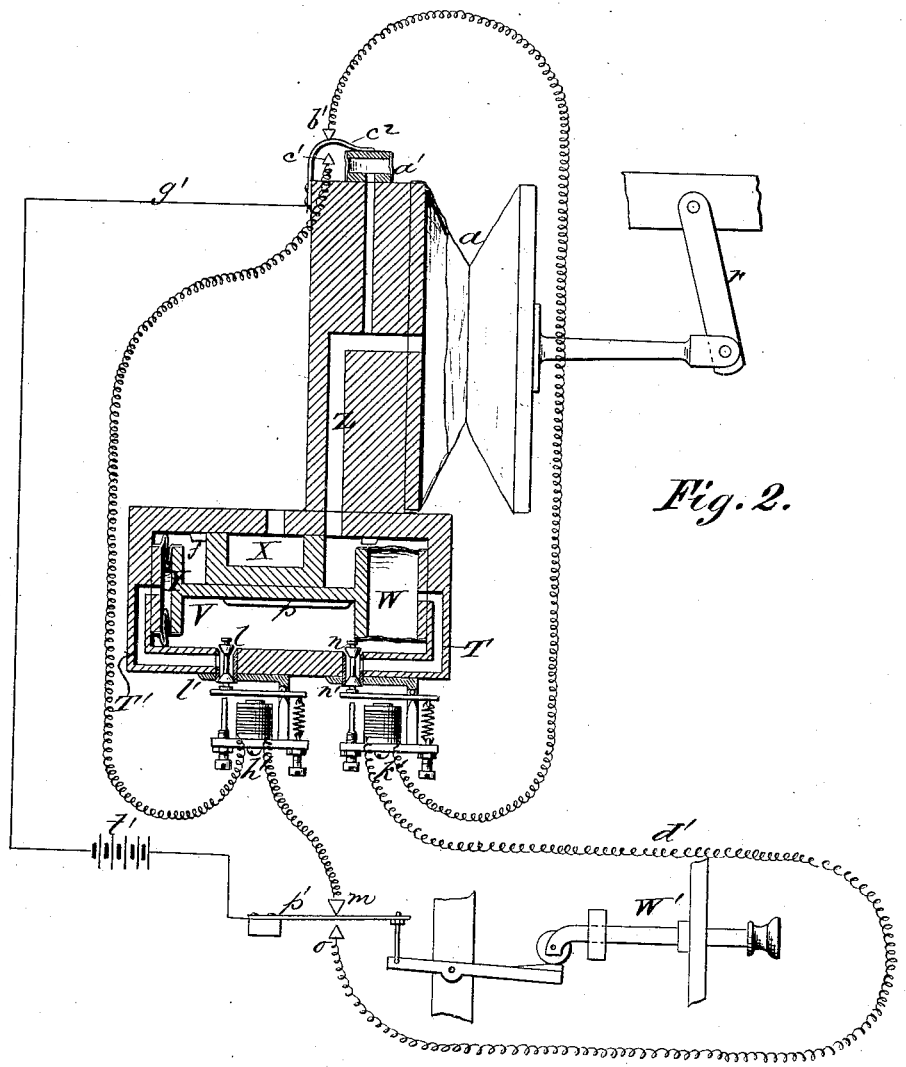

Figure 1 represents a view of the apparatus in position to operate. Fig. 2 is a view of the same apparatus with the bellows extended.

The mechanical power used in performing the work at a distance is intended to be compressed air generated in an apparatus capable of maintaining a constant supply during the operation of the apparatus.

This apparatus is arranged to be moved in both directions by means of currents of electricity sent through different circuits, and as it is not desirable that the batteries should remain constantly in circuit an apparatus has been devised by which the battery, after it has performed its useful work, has its circuit broken, and is arranged to then operate the apparatus in the opposite direction.

The pneumatic connections will first be described and then the method of operating them by the battery.

Controlling-valve X is situated in an airbox, V, in which are two bellows, Y and W.
These bellows connect by tubes T T' with valves $l\ l'$ and $n\ n'$, controlled by magnets. These bellows are rigidly connected to operating-valve X. Now, it is plain that if the bellows Y be connected with the interior of the air-box V while the bellows W is connected with the atmosphere the pressure in the bellows Y will move the apparatus to the right, not being controlled by pressure in the bellows W; but if the position of the valves be alternated the valve will move in the opposite direction. The valve X connects the bellows $a$ alternately with the atmosphere and with the interior of the air-box, and this bellows $a$ does the work required. A spring (not shown) attached to the lever $r$ tends to collapse the bellows. Connected with the air-space within the bellows $a$ is the supplemental bellows $a'$, operating in a way to be described. The valves $W'\ n\ n'$ are controlled by magnets, as shown. The circuits through these magnets are clearly shown.

W' represents a stop which can shift the spring $p'$ from its contact on the point $o$ to its contact on the point $m'$, thereby changing the circuit of the battery $t'$. The circuit of this battery is completed in the other direction through the wire $g'$, spring $c^2$, point $c'$, wire to magnet $h'$, and point $m$, or through point $b'$, wire $e'$, magnet K', wire $d'$, and point O.

Suppose the apparatus to be in the position shown in Fig. 1 and the stop to be pulled out, then the first result would be to make a contact between the spring $p'$ and the point $m$. Thereby the magnet $h'$ is operated and the valve $l\ l'$ depressed. Then the bellows Y is put in communication with the atmosphere, and the bellows W, being in communication with the air-pressure in the box, expands, throwing the valve X in the opposite position. Thereby the bellows $a$ is put in communication with the valve-box V and is expanded; but simultaneously the bellows $a'$ is expanded, thereby breaking the contact between the point $c'$ and $c^2$ and making a contact between $b'$ and $c^2$. This position is shown in Fig. 2. It will thus be seen that the circuit of the battery $t'$ is broken by this operation; but a new course is made for the circuit through the magnet K', through which circuit the battery will flow when the stop W' is closed.

He has shown one form of mechanism for carrying out the purpose of his invention; but it is obvious that many different forms could be devised which would operate upon the same principle and be in effect the same apparatus as that which he has here shown, and he does not therefore limit himself to the specific apparatus described.

It is obvious that the electric switch $c^2$ may be of different constructions, and may be operated by some other moving part of the apparatus, such as bellows $a$, instead of the supplemental bellows $a'$, though the form shown is preferred. It is obvious, likewise, that this invention of the supplemental switch is applicable to other forms of organ action beside that shown, the principle of it being the combination of the bellows with a two-point switch, so as to prevent the useless work of the battery.

He does not in this application claim anything claimed in application No. 31,716, for electro-pneumatic apparatus for ringing bells, filed April 25, 1881, by Hilborne L. Roosevelt, deceased, and wherein the apparatus forming the subject-matter of this application is shown applied to an apparatus for ringing bells, this case being a division of said application.

What is claimed as his invention, and what it is desired to secure by Letters Patent, is—

1. In an electro-mechanical apparatus for performing work at a distance, the combination of two electro-magnets controlling the apparatus adapted to perform the work with a key adapted to make two connections, a battery, the circuits shown, and an automatic circuit-switching device, by means of which the circuit through one magnet is automatically switched through the other magnet after the first magnet has completed its work, substantially as described.

2. In an electro-pneumatic apparatus for performing work at a distance, the combination of a battery, two electro-magnets, separate branch circuits in which the magnets are situated, a bellows moving a switch in connection with the battery between opposite contacts in said branches to energize one or the other of said magnets, a compressed-air chamber, and a valve controlled by said magnets governing a passage from the compressed-air chamber to the said bellows, substantially as described.

3. In an electro-pneumatic apparatus for performing work at a distance, the combination of a battery, two electro-magnets, two branch circuits in which are situated said magnets, a switch in connection with the battery movable between opposite contacts in said branches, a compressed-air chamber, a bellows in communication with said chamber which moves the switch into contact with one or the other of said contacts, a valve controlling the air-passage to said bellows, bellows Y W, connected with said valve and in communication with the compressed-air chamber, and valves operated by the armatures of the magnets controlling the air-passages to bellows Y W, substantially as described.

4. The combination, in an electric organ-action, of a battery, a key making two connections, two magnets operated by said two connections and alternately controlling the movement of a bellows, a bellows operating a switch making two electrical connections, and the circuit from said switch to the battery, whereby the battery is utilized to perform the work necessary to operate the bellows, and is then automatically cut off, substantially as described.

5. The combination of the key or stop W', operating the double switch P', the magnets K' H', battery T', and double switch $C^2$, and the connections shown, whereby the operation of the double switch $C^2$ alternately shifts the battery-current from the magnet H' to the magnet K', substantially as described.

In testimony whereof I have signed my name to this specification in the presence of two subscribing witnesses.

A. ROOSEVELT,
*Executor of Hilborne L. Roosevelt.*

Witnesses:
 E. CLINTON POTTS,
 ISAAC HICKS.